United States Patent [19]

Herr et al.

[11] 3,872,956

[45] Mar. 25, 1975

[54] FLUID OPERATED CENTRIFUGAL CLUTCH

[75] Inventors: Charles H. Herr; Gunter W. Schulz; George S. Bull, all of Peoria, Ill.

[73] Assignee: Caterpillar Tractor Co., Peoria, Ill.

[22] Filed: Sept. 4, 1973

[21] Appl. No.: 394,166

[52] U.S. Cl....... 192/85 F, 192/103 FA, 192/104 F, 192/113 B
[51] Int. Cl............................................ F16d 43/06
[58] Field of Search............ 192/85 F, 105 A, 105 F, 192/103 F, 103 FA, 106 F, 104 F

[56] References Cited
UNITED STATES PATENTS

| | | | |
|---|---|---|---|
| 2,210,416 | 8/1940 | Kiep et al. | 192/105 A X |
| 2,297,480 | 9/1942 | Kratzmann | 192/104 F |
| 2,352,478 | 6/1944 | Halford | 192/105 A |
| 2,864,479 | 12/1958 | Schindler | 192/103 FA |
| 3,485,328 | 12/1969 | Bilton | 192/105 A X |
| 3,537,557 | 11/1970 | Olson | 192/106 F |
| 3,581,858 | 6/1971 | Haley | 192/106 F |
| 3,750,789 | 8/1973 | Buchelt | 192/105 A |

FOREIGN PATENTS OR APPLICATIONS 384,836  12/1932  United Kingdom............ 192/105 A

*Primary Examiner*—Benjamin W. Wyche
*Attorney, Agent, or Firm*—Caterpillar Tractor Co.

[57] ABSTRACT

A control system for a rotating clutch in an engine driven power train having a rotating housing and an actuating piston axially movable in a bore defined therein in a direction to engage the clutch when fluid is supplied to a chamber formed between the piston and the housing. A clutch control valve is infinitely variably positionable to control fluid flow to the chamber in a direction to bias the actuating piston toward clutch engagement through centrifugal force acting on the fluid in the combination with an outlet passage in the housing through which fluid is continuously outwardly bled from the chamber by such centrifugal force so that partial engagement of the rotating clutch can be achieved at relatively high engine speeds to effect a disproportionately lower power train speed at any control valve setting intermediate full clutch engagement and disengagement.

8 Claims, 5 Drawing Figures

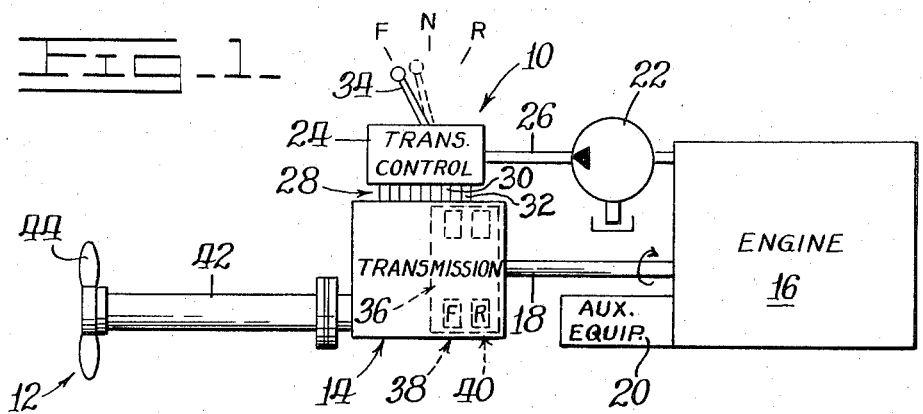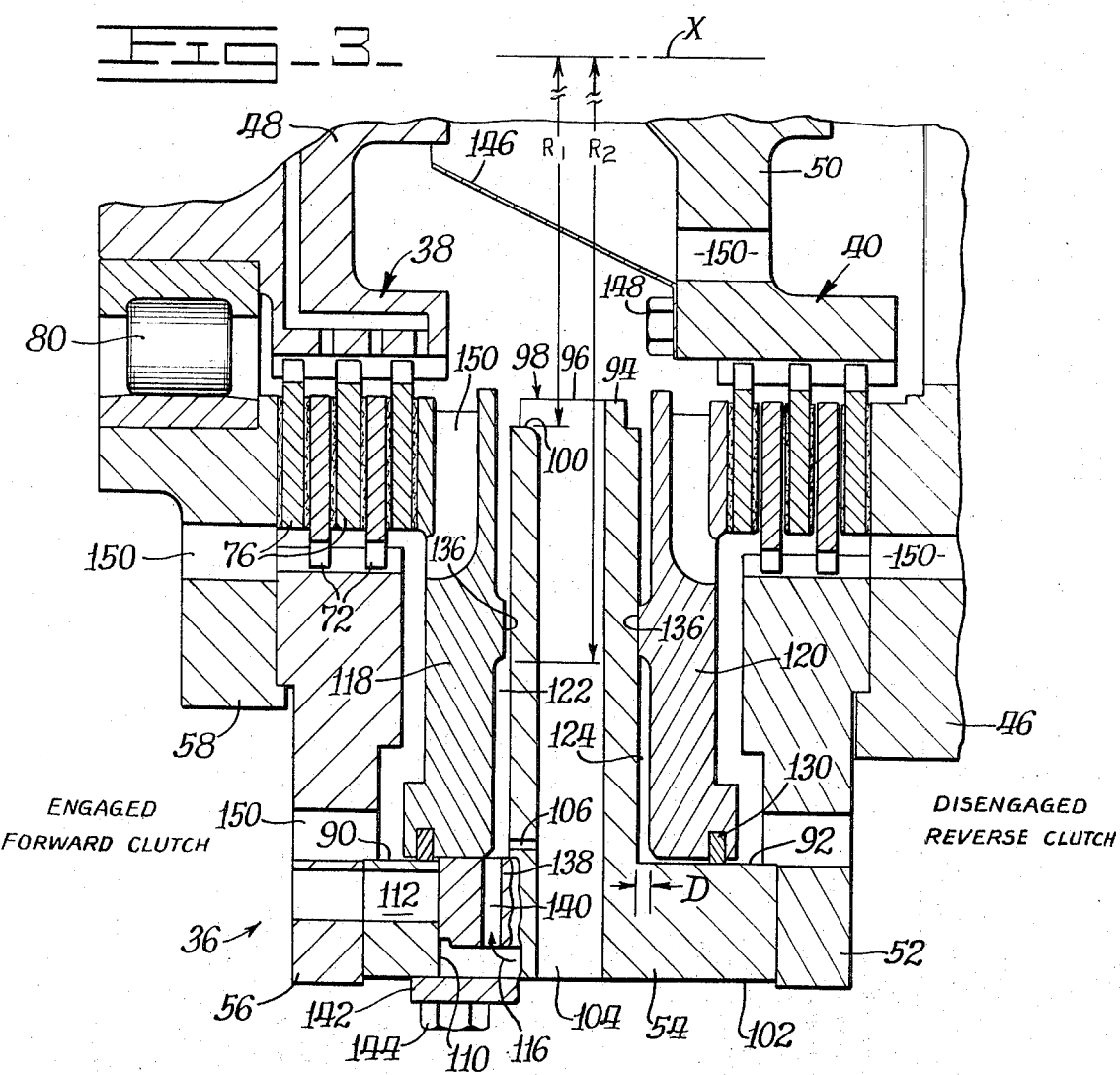

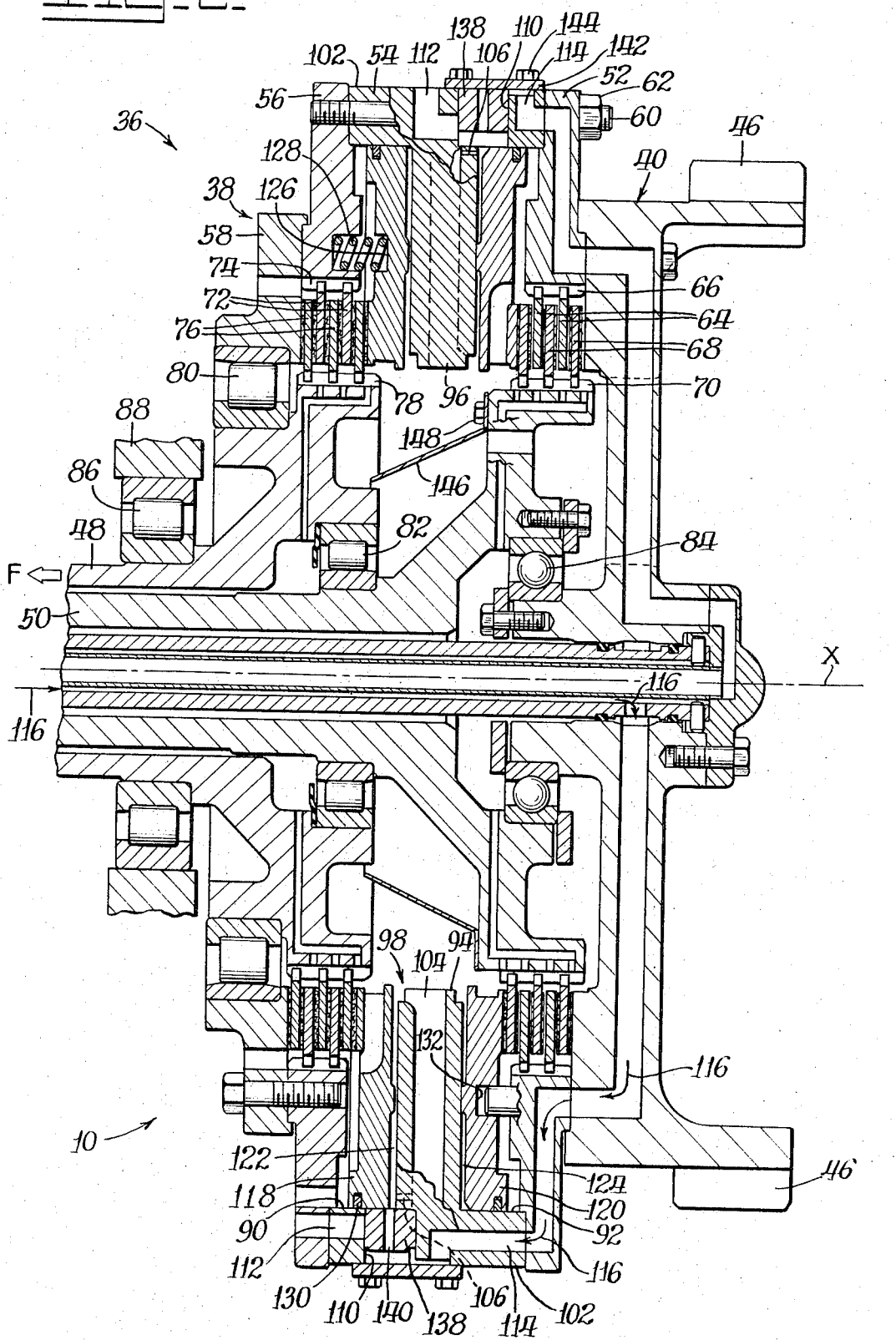

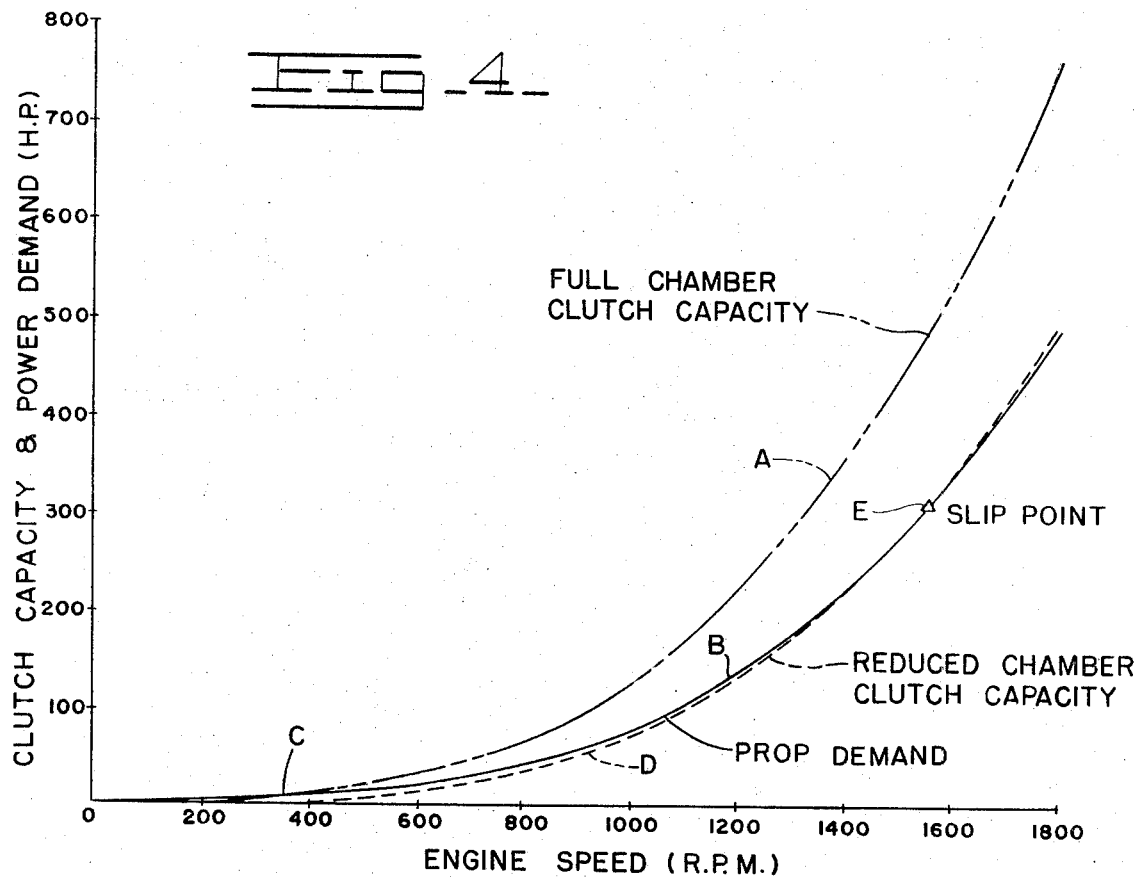
Fig-4-
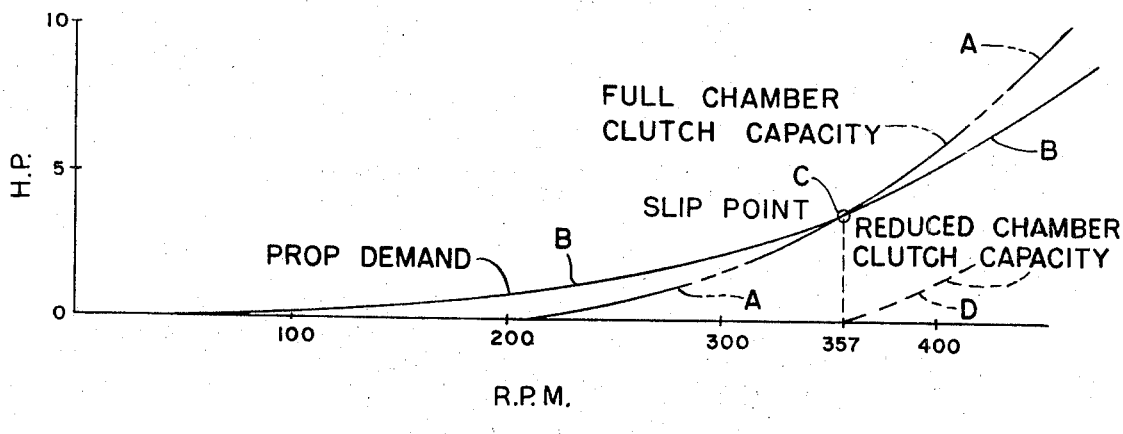
Fig-5-

3,872,956

FLUID OPERATED CENTRIFUGAL CLUTCH

BACKGROUND OF THE INVENTION

One of the major problems with engine driven power trains for various vehicles and seagoing vessels or the like is the diverse requirements for apportioning power to the power train output shaft and to the engine driven auxiliary equipment under a variety of working conditions. For example, during close maneuvering of the vehicle in a given power train gear ratio it is often necessary to reduce engine speed in order to provide the degree of control and safety required. Unfortunately, when the engine speed is reduced, the power delivered to such auxiliary equipment by the engine through various power take-off mechanisms is also reduced. This substantially decreases the general performance of the auxiliary equipment including the power output and rate of response thereof with the frustrating result of lowering the overall effectiveness of the vehicle. Therefore, a primary requirement of such a power train and its associated control system is the ability to deliver considerably less power to the output shaft at relatively high engine speeds in order to drive the auxiliary equipment at a relatively effective rate of speed and while simultaneously moving the vehicle relatively slowly.

Another major problem is the need to smoothly shift the clutches of a power train upon selecting a new gear ratio or upon making a directional change. For those clutches having a fluid actuated piston and a plurality of interleaved plates and discs it is necessary to minimize the rate of energy absorption in the clutches under such transient circumstances in order to extend the service life of the plates and discs, and yet at the same time achieve a relatively responsive rate of change for a fast work cycle. Sophisticated and expensive automatic control systems have been developed to cushion the engagement of such clutches, but even these systems fail to proportion the rate of energy absorption to the engine speed or allow the operator to fully control the engagement rate through manipulation of a manually operated transmission control lever or the like. Heretofore substantially one relatively rapid rate of clutch engagement has been adopted, for instance corresponding to a forward-to-reverse shift at maximum engine speed. Such a system is overly responsive under a variety of working conditions, and to regain the degree of control and safety required for close maneuvering of the vehicle the operator again is forced to reduce engine speed with the undesirable results mentioned above.

Various centrifugally controlled friction-type clutches have been heretofore proposed which will slip continuously under the control of the operator in order to apportion power to separate power paths. An example of such clutch control systems is set forth in U.S. Pat. No. 3,352,395 to C. R. Hilpert. However, such controls require centrifugally metering type valves which are relatively sensitive to variations in speed and are complex in construction in order to obtain the degree of control desired. A relatively high fluid pressure is directed through such a metering valve to a completely closed piston actuating chamber and this exposes the various elements of the clutch and its control to more severe operating requirements which decreases the service life thereof.

In addition to the above, rotating clutch control systems typically experience the tendency to remain engaged even after pressure from the controlling source is released, since fluid is frequently trapped in the actuating chamber behind the clutch due to centrifugal action. Therefore, another requirement of a desirable rotating clutch control system is the ability to release such otherwise trapped fluid.

It is also well known that the engagement of a clutch at a low engine speed will frequently result in stalling out the engine from the load that is immediately placed upon it. Thus, for reasons of safety it is further desirable to automatically limit the amount of torque transmitted through the clutch to relatively low values at low engine input speeds.

SUMMARY AND OBJECTS OF THE INVENTION

It is therefore an object of the present invention to provide a relatively simple and economical, yet positive control system for a rotating clutch in an engine driven power train which will permit less power to be delivered through the power train at relatively high engine speeds by controlled partial engagement of the clutch.

Another object of the invention is to provide such a rotating clutch control system which is able better to smoothly engage and disengage the clutch of a power train upon selecting a new gear ratio or making a directional change independently of or under the manual direction of the operator.

Another object of the present invention is to proportionately reduce the energy capable of being transmitted through the rotating clutch when the engine input speed is reduced from its normal operating range.

Another object of the rotating clutch control system of the present invention is to extend the service life thereof by utilizing relatively low fluid pressure.

Other objects and advantages of the present invention will become more readily apparent upon reference to the accompanying drawings and following description.

BRIEF DESCRIPTION OF THE DRAWINGS

FIG. 1 is a schematic elevational side view of a marine propulsion system and transmission embodying the rotating clutch control system of the present invention.

FIG. 2 is a fragmentary longitudinal vertical section of the input portion of the transmission shown in FIG. 1 taken through the axis of rotation thereof, and showing a pair of rotating clutches incorporating the flow control system of the subject invention.

FIG. 3 is an enlarged, fragmentary longitudinal vertical section of the present invention corresponding generally to the lower half of FIG. 2.

FIG. 4 is a graph showing the relationships of clutch capacity and power demanded by the propeller of a marine propulsion system utilizing the features of the present invention in horsepower to the engine input speed in revolutions per minute.

FIG. 5 is a graph similar to FIG. 4 showing a portion thereof greatly enlarged.

DESCRIPTION OF PREFERRED EMBODIMENT

Referring to the drawings, a rotating clutch control system identified generally by the reference numeral 10, and embodying the principles of the present invention, is shown in FIG. 1 in the environment of a marine propulsion system power train 12 including a marine gear transmission 14. A power plant or engine 16 delivers torque to the marine gear transmission through a driving member 18, and also directly drives auxiliary equipment 20 such as fish-net-handling winches or the like, as well as a hydraulic pump 22.

A clutch control valve or transmission control 24 receives pressurized fluid from the pump 22 through an inlet conduit 26 and supplies it under controlled conditions to the transmission 14 through a plurality of passages identified generally by the reference numeral 28. Such plurality of fluid directing passages to the transmission more specifically include a forward clutch supply passage 30 and a reverse clutch supply passage 32. A manually operated speed and directional control lever 34 associated with the transmission control has a centrally disposed neutral position N, and forward and reverse positions F and R disposed on either side thereof for regulating the rate of flow of fluid from the inlet conduit 26 at a relatively low pressure to the forward and reverse clutch supply conduits 30 and 32, respectively, as will hereinafter be described.

A rotating clutch assembly 36, including a forward rotating clutch assembly 38 and a reverse rotating clutch assembly 40, is disposed at the input end of the marine gear transmission 14 for selectively directing power to propeller output shaft 42. The rotating clutch assembly is driven by the engine 16 and the driving member 18 at an input gear or driving member 46, as best shown in FIG. 2. Power delivered to the input gear causes the clutch assembly to rotate about a longitudinal transmission axis X. Power is subsequently delivered to a forward output shaft 48 or a reverse output shaft 50 with engagement of the forward and reverse rotating clutch assemblies 38 and 40, respectively. These two output shafts are drivingly coupled to the output shaft 42 of the power train 12 shown in FIG. 1 through gearing of the type shown in U.S. Pat. No. 3,566,707 to G. W. Schulz, and assigned to the assignee of the present invention.

More specifically, the rotating clutch assembly 36 of the present invention includes in substantially series related order the input gear 46, a reverse clutch drive ring 52, a clutch piston retaining cylinder 54, a forward clutch drive ring 56, and an end plate 58, which are held together by a plurality of peripherally arranged, longitudinally oriented studs 60 and a corresponding plurality of retaining nuts 62. Internally associated therewith is the reverse rotating clutch assembly 40 which includes a plurality of externally toothed clutch plates 64 which are axially slidable on a corresponding plurality of driving splines 66 formed on the inner periphery of the reverse clutch drive ring 52, and a plurality of internally toothed clutch discs 68 which are axially slidable on a like number of driven splines 70 formed on the external periphery of the reverse output shaft 50. Similarly, the forward rotating clutch assembly 38 includes a plurality of externally toothed clutch plates 72 which are axially slidable on a plurality of driving splines 74 formed on the inner periphery of the forward clutch drive ring 56, and a plurality of internally toothed clutch discs 76 axially slidable on a like number of driven splines 78 formed on the outer periphery of the forward output shaft 48. A plurality of antifriction bearings 80, 82, and 84 are disposed between the rotating clutch assembly 36 and the output shafts 48 and 50 in the usual manner to allow relative rotation therebetween. Also, another similar bearing 86 is disposed between the forward output shaft 48 and a stationary housing portion 88 to give additional support to the rotating clutch assembly 36 of the present invention.

Reference is now made to the construction of the centrally disposed clutch piston retaining cylinder 54 shown in FIGS. 2 and 3. The piston retaining cylinder has a pair of symmetrically opposite, axially outwardly facing, piston receiving, bores 90 and 92 serving to form therebetween a radially inwardly extending central wall 94 having an internal bore 96 therethrough. At least one axially outwardly facing, radially inwardly disposed arcuate pocket identified generally by the reference numeral 98 is associated with each of the clutch assemblies 38 and 40. As best shown in FIG. 3, each pocket has a fluid-receiving lip 100 with a radius $R_1$ as measured from the longitudinal transmission axis X. As will hereinafter be described, any excess fluid entrapped within the rotating clutch assemblies adjacent the wall 94 is in communication with such arcuate pockets, and is allowed to flow over the lip 100 and exhaust radially outwardly through a relief passage 104.

The piston retaining cylinder 54 of the present invention further includes at least one bleed passage 106 for each of the forward and reverse rotating clutch assemblies 38 and 40. Such bleed passages are of a predetermined size to permit a relatively limited rate of fluid flow between each of the bores 90 and 92 radially adjacent the periphery thereof and axially outwardly adjacent the central wall 94 to exhaust fluid radially outwardly of the rotating clutch assembly 36. Preferably, such passages may exhaust fluid to the relief passages 104. The piston retaining cylinder 54 also includes in diametrically opposed relation as shown in FIG. 2 a pair of substantially radially extending dump valve bores 110. Each of the bores has an exhaust or draining passage 112 and a fluid supply passage 114 in axial communication therewith. The supply passages 114 are in fluid associated relation with the respective forward and reverse clutch supply passages 30 and 32 mentioned above through intermediate circuitous passages of the usual type as representively shown by a plurality of forward clutch actuating flow arrows 116.

The bores 90 and 92 of the piston retainer 54 respectively receive therein a forward clutch actuating piston 118 and a reverse clutch actuating piston 120 which serve to define with the central wall 94 a radially inwardly open forward clutch actuating chamber 122 and a similar reverse clutch actuating chamber 124. As representatively shown in the upper left portion of FIG. 2, each of the actuating pistons includes a plurality of axially outwardly facing, cylindrical pockets 126 adapted to receive a corresponding plurality of relatively light piston retraction springs 128. These springs are also received in corresponding opposite pockets in the drive rings 52 and 56 and insure positive disengagement of the clutches in the absence of sufficient counteracting fluid pressure in the actuating chambers 122 and 124 to bias the actuating pistons. An annular seal ring 130 is disposed about the outer periphery of each of the axially slidable pistons to provide a substantially fluidtight relationship between the pistons and the bores 90 and 92. Also, as representatively shown in the lower right portion of FIG. 2, each of the actuating pistons includes a plurality of axially outwardly facing blind bores 132 adapted to slidably receive a corresponding number of axially positioned dowels 134 which are fixedly associated with the drive rings 52 and 54 in such a manner that axial sliding movement of the pistons is permitted while any rotation therebetween is prevented.

As shown best in FIG. 3, each of the actuating pistons 118 and 120 further has a plurality of axial protrusions or embossments 136 facing inwardly toward the central wall 94 to provide a predetermined minimum axial distance D between the piston and the wall. This assures that a sufficient minimum size of the fluid chamber 122 and 124 is available for positive and rapid engagement of the clutch assemblies 38 and 40.

A quick dump valve or spool 138 is disposed within each of the dump valve bores 110 and is adapted for free radial sliding movement therein. In the radially inwardly disposed position of the spool 138, as shown in the lower portions of FIGS. 2 and 3, the actuating chamber 122 is blocked from the exhaust passage 112, and a flow limiting passage 140 defined radially centrally in the quick dump spool allows direct fluid communication between the fluid supply passage 114, the flow limiting passage and the piston actuating chamber. To achieve such an active mode of operation for the forward clutch assembly 38, the operator control lever 34 is positioned toward the forward F position shown in FIG. 1. At such time the transmission control 24 is effective to deliver fluid from the inlet conduit 26 to the forward clutch supply passage 30 and circuitously to the bore 110, as shown by arrows 116, so that the centrifugal influence on the quick dump spool 138 tending to urge the spool outwardly is overcome. On the other hand, the diametrically opposite and similar quick dump spool associated with the reverse rotating clutch assembly 40 is in a fluid draining mode of operation, as best shown in the upper portion of FIG. 2. Since the reverse quick dump spool is not exposed to a supply pressure in the reverse clutch supply passage 32 and the associated passages 114, it is biased outwardly by centrifugal force acting on the rotating clutch assembly 36 of the present invention where it abuts a plate 142 removably secured to the retainer surface 102 by a plurality of bolts 144. In this position of the quick dump spool, the exhaust passage 112 is in direct communication with the reverse clutch actuating chamber 124 through the bore 110 and substantially all of the actuating fluid therein is allowed to quickly pass radially outwardly through the bore and exhaust passage.

With reference to the actuated forward rotating clutch assembly 38 of the present invention shown in the lower portion of FIG. 2, the fluid flow along the path identified by arrows 116 is communicated to the forward clutch actuating chamber 122 through the flow limiting passage 140 and is communicated outwardly to exhaust via one or more of the bleed passages 106 which are also of a predetermined size. By controllably restricting the amount of fluid supplied to the quick dump spool 138, the rate of fluid exhaust through the bleed passage is sufficient to establish an intermediate level of fluid depth in the actuating chamber. As best shown in FIG. 3, such intermediate fluid level may extend radially inwardly from the bore 90 to a radial distance $R_2$ from the axis X which is greater than the $R_1$ distance established by the central wall lip 100. Thus, the effective inner radius of the fluid may be varied to achieve an infinitely variable fluid torus so that continuous partial engagement of the forward rotating clutch assembly may be achieved through a wide range corresponding to the setting of the control lever 34 by the reaction of such a fluid torus on the forward clutch actuating piston 118.

Since the bearings 80, 82, 84 and 86 of the rotating clutch assembly 36 and the various elements of the forward and reverse rotating clutch assemblies 38 and 40 are continually lubricated to extend the service life thereof in a well known manner, an oil shield 146 is removably secured to the reverse output shaft 50 by a plurality of bolts 148. This shield is disposed in substantially axially aligned relation to the central wall 94 and in outwardly extending relation therefrom to overlap the forward and reverse actuating chambers 122 and 124 to assure that such lubricating fluid will not have access to the chambers where it could otherwise detrimentally influence the controlled flow condition thereto. A plurality of other fluid relief passages in the rotating clutch assembly 36, and identified generally by the reference numeral 150, serve to enhance radial and axial movement of the lubricating fluid away from the actuating chambers.

OPERATION

While the construction and operation of the present invention is believed clearly apparent from the foregoing description, further amplification will subsequently be made in the following brief summary of the operation thereof. When the transmission control lever 34 shown in FIG. 1 is disposed in its forward F position, the transmission control 24 delivers fluid at a predetermined maximum flow rate through the supply passage 30, and the passages 114 to the dump valve bore 110. As best shown in FIG. 3, the fluid biases the quick dump spool 138 radially inwardly against centrifugal force acting on the rotating clutch assembly 36, and continues to flow radially inwardly through the flow limiting passage 140 to the forward clutch actuating chamber 122. Since a maximum flow rate is being delivered to the chamber and one or more of the bleed passages 106 allow only a predetermined lesser quantity of fluid to be exhausted substantially radially outwardly from the actuating chamber, the depth of fluid continues to increase radially inwardly until the minimum radius identified at $R_1$ is reached. At this point, corresponding to full engagement of the forward rotating clutch assembly 38, excess fluid is communicated to the arcuate pocket 98 over the lip 100 and is allowed to exhaust radially outwardly through one or more fluid relief passages 104. The greater radial distance of the lip 100 when compared to the wall internal bore 96 assures that any excess fluid is not permitted to travel axially where such overflow could otherwise detrimentally influence the adjacently disposed reverse actuating chamber 124. Further, the size of the flow limiting passage 140 limits the maximum amount of fluid permitted to be delivered to the chamber and hence the fluid excess which is exhausted is also limited. This decreases the amount of circulating fluid necessary during the steady state performance of the clutch and enhances system reliability.

With the above-mentioned maximum amount of fluid in the chamber 122 or maximum fluid torus, the total force acting on the forward clutch actuating piston 118 to engage the interleaved plates 72 and the discs 76 is directly proportional to the speed of rotation of the clutch assembly 36. Such relationship is generally represented by the graph of FIG. 4 wherein the phantom curve identified by the letter A represents the maximum clutch capacity in horsepower with respect to increasing engine speed in rpm. Curve A takes into account the fact that the actuating piston is biased toward disengagement by the retraction springs 128 so that a relatively fixed spring force must be subtracted from the force of the centrifugal head of fluid in the chamber to arrive at the effective or resultant capacity curve A.

If the marine propulsion system 12 has a maximum horsepower requirement as indicated by the solid curve B in the graph of FIG. 4, and particularly by the enlarged portion thereof as shown in FIG. 5, its intersection with the resultant capacity curve A is referred to as the slip point, as identified at C. When the speed of the engine 14, for example, is established at a relatively low value by manipulation of the engine throttle (not shown) in the usual manner, then the system demand may be in excess of the capacity of the engine, and the fully filled torus of oil in the forward clutch actuating chamber 122 is insufficient to maintain the clutch completely engaged. This condition of continuous clutch slip occurs below an engine speed of 357 rpm in the given example, and such slip effectively prevents excessive loading of the engine. Thus, the rotating clutch assembly of the present invention serves as a safety device at low engine speeds to prevent excess loading of the engine by reducing the transmission of power to the propeller 44 in a controlled manner.

While the speed of the engine 14 may be reduced by control of the engine throttle to decrease the energy transmitted to the propeller 44 as mentioned above, the performance of the auxiliary equipment 20 and pump 22 driven directly by the engine may be adversely affected, resulting in slower response and poorer performance thereof. The control system of the present invention allows the fluid flow rate to and from the rotating clutch actuating chambers 122 or 124 to be accurately modulated to achieve a reduced clutch capacity, permitting controlled slip of the clutch and less power to the propeller while maintaining the speed of the engine. As best shown in FIG. 1, the control lever 34 may be moved to a position intermediate the maximum flow rate forward and reverse positions identified by the letters F and R, and a centrally disposed neutral position N as shown typically by the broken lines. With this intermediate positioning of the control lever, the flow rate of fluid delivered to the forward clutch actuating chamber 122 may be limitedly controlled to result in obtaining the inner fluid radius $R_2$ as shown in FIG. 3, as mentioned above. The control system of the present invention allows an accurately modulated decrease of the torus of fluid in the actuating chamber from the maximum inner fluid radius $R_1$ corresponding to the full forward or reverse positions of the control lever to some intermediate inner fluid radius $R_2$ because the fluid flow rate into the chamber is infinitely variable matched to the fluid flow rate exhausting outwardly from the chamber through one or more of the bleed passages 106. Such matching is achieved through the gradual movement of the control lever by the operator, and it is not necessary for the operator to return the lever to a neutral position in order to fully evacuate the radially inwardly open chamber prior to establishing such intermediate position of the lever and building up the size of the fluid torus as would be the case without the bleed passages 106. Such a smaller torus of fluid in the actuating chamber subsequently results in a reduced clutch capacity curve shown in the broken curve D in FIGS. 4 and 5. With the same horsepower demand curve B, a new slip point E occurs, indicating that the forward clutch assembly 38 slips at a higher engine input speed. This provides, in effect, a greater priority to the horsepower demands of the auxiliary equipment 20 and the pump 22, and less priority to the propeller 44. This flexibility for power division is highly desirable in close quarter maneuvering of the vehicle and when relatively high auxiliary equipment demands must be met. The easily variable inner radius of the torus of fluid in the clutch piston actuating chambers 122 and 124 of the present invention allows precise matching of the clutch capacity to the specific power requirements of the marine propulsion system 12 including the propeller, the auxiliary equipment, and the pump.

Manipulation of the control lever 34 to its neutral N position is effective to relieve the fluid biasing force holding the forward clutch quick dump spool 138 radially inwardly by exhausting the forward clutch supply passage 30 which permits the spool to move rapidly outwardly to its abutting position with respect to the plate 142. Fluid in the forward clutch actuating chamber 122 is then allowed to flow relatively quickly and freely to the exhaust passage 112, rather than be relieved more slowly through the bleed passages 106 if the dump spool and exhaust passage were not provided. Thus the present invention allows rapid clutch disengagement as well as progressively modulated clutch disengagement which occurs when the control lever is moved slowly from the full forward F position toward the neutral N position.

Despite a rapid shift of the control lever 34 from forward to reverse, the immediate disconnect of the forward rotating clutch assembly 38 is followed by a desirable smooth and modulated rate of engagement of the reverse rotating clutch assembly 40. The rate of growth of the torus of fluid in the actuating chamber 124 is dependent primarily on the sizing of the bleed passages 106, the flow limiting passage 140 in the quick dump spool 138, and the speed of rotation of the rotating clutch assembly 36. It is, therefore, expedient to tailor or match the various passage parameters of the rotating clutch control system in order to cushion or otherwise absorb the shocks associated with such a forward to reverse shift. This is accomplished by firstly providing a predetermined maximum rate of fluid flow to the chamber and secondly providing a predetermined maximum rate of fluid flow outwardly from the chamber to thus effect a maximum rate of growth of the torus of fluid in the piston actuating chamber. In one successful embodiment the size of the flow limiting passage 140 is a 0.188 inch diameter, while the size of a single bleed passage 106 is a 0.094 inch diameter.

Thus, the rotating clutch control system of the present invention provides for smooth engagement of a rotating clutch utilizing the centrifugal force of a torus of fluid to provide the piston engaging force against a plurality of interleaved clutch discs and plates. Since the generated force of the fluid varies as the square of the engine input speed, following the laws of centrifugal force, the otherwise possible engagement of the opposite directional clutch too quickly with accompanying possible engine reversal and damage is obviated. This feature is particularly advantageous in a marine application, with the ability of such a clutch to further act as a propeller brake during ship reversals, minimizing the propeller reversal time. The rotating clutch of the present invention further has the ability to turn the propeller at infinitely varying slow speeds when maneuvering close to docks or other craft by varying the inner radius of the fluid torus upon proper manipulation of the control lever or by varying engine speed with a full torus of fluid, or a combination of both operations where relatively fine control is desired.

While the foregoing description includes a rotating clutch control system with a quick dump spool 138 for the purpose of relatively rapidly disengaging the clutch, under certain specific vehicle power train requirements it may be desirable to provide a slower rate of clutch disengagement. This may be accomplished without departing from the spirit of the present invention by deleting the quick dump spool and disposing the clutch actuating piston in a closed bore 90 so that the fluid flow rate outwardly from the actuating chamber 122 solely through one or more of the bleed passages 106 would control clutch disengagement upon a sufficient reduction of fluid flow to the actuating chamber. With fluid flow to the chamber terminated, the rate of disengagement of the clutch would be determined primarily by the sizing of the bleed passages. Actuating fluid could be supplied at a controlled rate radially outwardly to the chamber from a radially inwardly disposed conduit or the like (not shown) at substantially atmospheric pressure. Any desired inner radius of the fluid torus could be maintained in this manner by matching the flow supplied by such a radially inwardly disposed conduit to the flow exhausting outwardly from the actuating chamber through the bleed passages.

While the present invention has been described and shown with reference to a marine propulsion system, it will be apparent that it can be utilized elsewhere and that variations might be possible that would fall within the scope of the present invention, which is not intended to be limited except as defined in the following claims.

What is claimed is:

1. A control system, for a rotating clutch, in an engine driven power train having a rotating housing providing a bore therein slidably receiving an actuating piston for engaging the clutch with the piston in the bore defining a radially inwardly open clutch actuating chamber within the housing, comprising;
   a source of relatively low pressure fluid;
   control valve means for infintely variably supplying said fluid to such chamber so that the actuating piston is biased in a direction to engage the clutch solely through centrifugal force acting on a torus of such fluid;
   spring means disposed between said housing and said actuating piston for positively disengaging said clutch in the absence of sufficient centrifugal force acting on said torus;
   bleed passage means in the housing communicating with said chamber to controllably continually exhaust fluid outwardly therefrom by such centrifugal force to reduce the biasing effect of the fluid against the actuating piston so that partial engagement of the clutch can be achieved particularly at relatively high engine speeds in order to effect a disproportionately lower power train speed at any setting of said control valve means below a predetermined maximum setting;
   inlet passage means in said rotating housing disposed between said control valve means and said chamber; and
   dump valve means associated with said rotating housing and in said inlet passage means for the immediate exhaust of fluid from said chamber to positively disengage the clutch in the absence of fluid supply from said control valve means.

2. The control system of claim 1 wherein said inlet passage means includes a radially extending bore, said dump valve means includes a quick dump spool freely slidably disposed in said bore with a flow limiting passage therein through which fluid enters said chamber, and said bleed passage means provides at least one bleed passage of a predetermined size in said housing which is disposed in substantially peripherally aligned relation to said bore for continually exhausting fluid outwardly from said chamber so that the size of said fluid torus may be reduced for partial engagement of the clutch with a reduction of supplied fluid from said control valve means.

3. A control system, for a rotating clutch having a plurality of interleaved clutch discs and clutch plates, in an engine driven power train having a rotating housing providing a bore for slidably receiving a clutch actuating piston therein, spring means in the housing to bias the piston in a first direction, the piston in the bore defining a radially inwardly open chamber within the housing, comprising;
   a source of relatively low pressure fluid external of said rotating clutch;
   control valve means for infinitely variably supplying said fluid through a path leading radially inwardly into such chamber and effective solely through centrifugal force to bias the piston in a second direction in opposition to such spring means;
   passage means in such housing and communicating with said chamber continually bleeding said fluid outwardly therefrom by centrifugal force and serving to reduce the biasing effect on the piston in the absence of sufficient flow of fluid to said chamber from said control valve means so that continuous partial engagement of the clutch can be optionally achieved at relatively high engine speeds in order to effect a disproportionately lower power train speed at any setting of said control valve means below a predetermined maximum setting; and
   fluid directing means within the housing for continually conducting lubricating fluid to such interleaved clutch discs and clutch plates through a separate path independently of said path of fluid from said control valve means while limiting access of said lubricating fluid to said chamber where it could otherwise detrimentally influence the biasing of said piston by said fluid from said control valve means.

4. The control system of claim 3 wherein said control valve means includes a manually operated valve for infinitely variably controlling the rate of fluid delivery to said chamber in opposition to fluid flow from said chamber through said passage means to allow full engagement and disengagement of said clutch as well as continuous partial engagement thereof.

5. The control system of claim 3, wherein said fluid directing means for limiting access of lubricating fluid to said chamber includes fluid relief passage means in said piston for collecting said lubricating fluid adjacent an inner diameter thereof and directing it generally radially outwardly and away from said chamber.

6. The control system of claim 5 in which said fluid directing means includes a fluid diverting shield disposed within the housing in spaced masking relation to said chamber.

7. The control system of claim 3 wherein said passage means includes an inlet passage in said rotating housing interconnecting said control valve means and said chamber, and dump valve means disposed in said inlet passage for substantially immediately exhausting fluid from said chamber in the absence of fluid supply from said control valve means.

8. The control system of claim 7 wherein said inlet passage includes a radially extending bore in said rotating housing and said dump valve means is a cylindrical spool which is disposed within said bore and biased radially inwardly by fluid from said control valve means, said spool having flow limiting means for providing a predetermined maximum rate of fluid flow to said chamber.

* * * * *